United States Patent
Hauer et al.

(10) Patent No.: US 6,894,249 B1
(45) Date of Patent: May 17, 2005

(54) METHOD AND DEVICE FOR CUTTING A FLAT WORKPIECE THAT CONSISTS OF A BRITTLE MATERIAL

(75) Inventors: Dirk Hauer, Nordenham (DE); Heinz-Georg Geissler, Hünstetten (DE)

(73) Assignee: Schott Spezialglas GmbH, Mainz (DE)

( * ) Notice: Subject to any disclaimer, the term of this patent is extended or adjusted under 35 U.S.C. 154(b) by 208 days.

(21) Appl. No.: 10/130,119

(22) PCT Filed: Sep. 8, 2000

(86) PCT No.: PCT/EP00/08779

§ 371 (c)(1),
(2), (4) Date: Jun. 7, 2002

(87) PCT Pub. No.: WO01/38242

PCT Pub. Date: May 31, 2001

(30) Foreign Application Priority Data

Nov. 20, 1999 (DE) .......................... 199 55 824

(51) Int. Cl.⁷ .............................................. B23K 26/00
(52) U.S. Cl. ............................ 219/121.72; 219/121.67; 219/121.85
(58) Field of Search ........................ 219/121.72, 121.67, 219/121.85, 121.68, 121.69, 121.6

(56) References Cited

U.S. PATENT DOCUMENTS

| 3,453,097 A | * | 7/1969 | Hafner ........................ 65/112 |
| 3,543,979 A | * | 12/1970 | Grove et al. .................... 225/2 |
| 3,932,726 A | * | 1/1976 | Verheyen et al. ...... 219/121.67 |
| 3,935,419 A | * | 1/1976 | Lambert et al. ....... 219/121.67 |
| 4,102,227 A | * | 7/1978 | Simko .......................... 83/881 |
| 5,622,540 A | * | 4/1997 | Stevens ....................... 65/112 |
| 5,871,134 A | | 2/1999 | Komagata et al. |
| 6,327,875 B1 | * | 12/2001 | Allaire et al. .................. 65/103 |

FOREIGN PATENT DOCUMENTS

JP  62046930 A  *  2/1987  .......... C03B/33/09

* cited by examiner

Primary Examiner—M. Alexandra Elve
(74) Attorney, Agent, or Firm—Walter Ottesen

(57) ABSTRACT

An arrangement for cutting a flat workpiece includes a drive unit for generating a relative movement between the focused laser beam (2) and the workpiece (1). The laser beam induces a thermomechanical stress in the workpiece along the cutting line. A scoring tool (7) generates an initial score at the start of the cutting line. A "flying" scoring is provided wherein a unit (5, 6, 8) moves the scoring tool (7). The unit is coupled in a controlled manner to the cutting movement of the laser beam (2) so that the scoring tool (7) can be brought into a short-time scoring working engagement with the workpiece (1) at the start of the cutting movement.

6 Claims, 1 Drawing Sheet

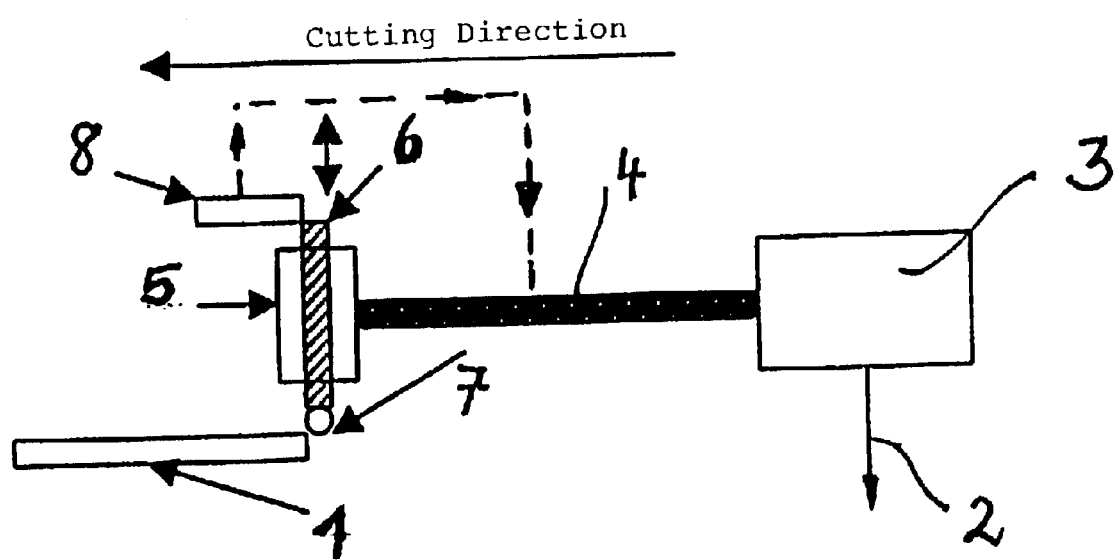

METHOD AND DEVICE FOR CUTTING A FLAT WORKPIECE THAT CONSISTS OF A BRITTLE MATERIAL

FIELD OF THE INVENTION

The invention relates to a method for cutting a flat workpiece made of brittle material, especially, glass or ceramic, with a laser beam by generating a relative movement between the laser beam and the flat workpiece while moving the laser beam along a pregiven cutting line with induction of a thermomechanical tension proceeding from a mechanically generated initial score. A preferred application is the cutting of flat

BACKGROUND OF THE INVENTION

The invention relates further to an arrangement for cutting such a flat workpiece by means of a laser beam.

Conventional separation methods for flat glass are based on first generating a score in the glass utilizing a diamond or a cutting wheel in order to thereafter break the glass along the weakened location generated in this manner by an external mechanical force. It is disadvantageous with this method that particles (splinters) are separated from the surface by scoring which can then deposit on the glass and there, for example, lead to scratches. Likewise, so-called marrings can arise at the cut edge which lead to an uneven glass edge. Furthermore, the microtears in the cut edge, which arise when scoring, lead to a reduced mechanical durability, that is, to an increased danger of breakage.

An approach for avoiding splinters as well as surface fractures and microfissures comprises separating glass on the basis of thermally generated mechanical stress. Here, a heat source is directed onto the glass and is moved relative to the glass at a fixed speed and thereby builds up a thermomechanical stress to such a high extent that the glass forms fissures. The necessary characteristic of the heat source to be able to position the thermal energy locally, that is, with an accuracy of better than a millimeter (which corresponds to the typical cut accuracies) is satisfied by infrared radiators, especially gas burners and especially lasers. Lasers have been proved and are in use because of their excellent focusability, good controllability of the power as well as the possibility of the beam formation and therewith the intensity distribution on the glass.

This laser cutting method induces a thermomechanical stress up to beyond the resistance to breakage of the material via a local warming with the focused laser beam in combination with a cooling from the outside. This laser cutting method is known from several publications. For example, reference is made to DE 43 05 107 C2.

This method distinguishes basically from the laser cutting methods known, for example, from EP 0 062 482 A1 or U.S. Pat. No. 5,120,926 wherein a melting of the glass takes place while forming a cutting groove. The cutting groove is continuously blown clean by a gas.

The first-mentioned laser beam cutting method has proved itself as the superior method for different reasons and has prevailed in practice. It is from this method that the invention proceeds.

Typically, a so-called start score or initial score is needed at the start of the desired cutting line in that, typically, a weakened location is generated mechanically on the glass surface or at the glass edge with a scoring tool, that is, a score is formed. The thermomechanical stress, which is built up by the laser beam on the cutting line leads then to a break of the glass which proceeds from the weak location. The generation of this initial score is, for example, described in U.S. Pat. No. 4,044,936.

In the known case, the initial score is generated with an interrupted relative movement between the laser beam and the flat workpiece to be cut, that is, a "momentary standstill" in a scoring process which is completely separate in that the scoring tool is pressed with a pregiven mechanical force onto the glass surface.

The disadvantages of the known method are:

The duration of the cutting method is extended in each case by some seconds because an initial score must be generated in advance of each laser cut. Furthermore, the duration of forming the score is relatively long so that the problem of damage of the glass with the formation of splinters arises.

SUMMARY OF THE INVENTION

The invention has the task to carry out the initially-mentioned method and to configure the initially-mentioned arrangement in such a manner that the times for the cutting process are reduced and the danger of damaging the brittle material is very low.

The solution of this task is achieved with the method for cutting a flat workpiece made of brittle material with a laser beam by generating a relative movement between the laser beam and the flat workpiece while moving the laser beam along a pregiven cutting line while inducing a thermomechanical stress and proceeding from a mechanically generated initial score in accordance with the invention in that the initial score is generated coupled with the start cutting movement of the laser beam.

The arrangement for cutting a flat workpiece of brittle material includes a laser beam, a drive device for generating a relative movement between the focused laser beam and the flat workpiece while moving the laser beam along a pregiven cutting line and with inducing a thermomechanical stress and with a scoring tool for generating an initial score at the start of the cutting line. With the above, the solution of this task in accordance with the invention is achieved in that a device for moving the scoring tool is provided which is controllably coupled in such a manner to the cutting movement of the laser beam that the scoring tool can be brought into a short-term scoring action with the flat workpiece with the start of the cutting movement or shortly thereafter.

In the principle according to the invention, the initial score is "flyingly" generated without stopping the relative movement, that is, in the same movement with which the cut by the laser beam occurs. In this way, the advantages listed below result compared to a completely separate scoring process.

For each cut, a shortening of the process time of a few seconds results.

The damage to the glass is held extremely low because of the short scoring duration which the "flying" scoring provides. In this way, splinters are avoided and the accuracy is increased.

DE 44 11 037 A 1 describes a method and an arrangement for separating the peripheral section of a rotating hollow glass during the manufacture thereof by means of a laser beam in combination with a mechanically generated initial score. Here, first a thermomechanical stress along the cutting line is generated in the rotating hollow glass with the laser beam and, only thereafter, a starting score is generated mechanically separately from the laser beam. Accordingly, in the known case, the start score is separately mechanically generated at any time without a direct coupling to the laser beam movement, for example, via a time control and is not coupled to the start cutting movement of the laser beam in advance of the laser beam cutting as in the invention.

The above-mentioned state of the art is in principle limited to the cutting of hollow glass where there is no start and no end of the cutting line. In contrast, the invention relates to the cutting of flat glass wherein the one edge defines the start and the other edge defines the end of the cutting line. The described problem of the interruption of the laser beam movement to set the starting score occurs only for a flat workpiece across which the laser beam is moved transversely in the initially-described state of the art and this led to the "flying" scoring in accordance with the invention.

BRIEF DESCRIPTION OF THE DRAWINGS

The invention will now be described with reference to the single FIGURE of the drawing showing an arrangement according to the invention for cutting a flat workpiece made of a brittle material.

DESCRIPTION OF THE PREFERRED EMBODIMENTS OF THE INVENTION

A flat glass substrate 1 is to be cut by a laser beam 2 of a laser scanner 3 along a pregiven cutting line.

The corresponding arrangements are known, for example, from the publications mentioned initially herein and therefore do not have to be explained here further. A relative movement is present between the laser beam 2 and the glass substrate 1 along the given cutting direction. Typically, the glass substrate is fixed in position and the laser beam 2 is moved. Conversely, the laser beam 2 can be fixed and the glass substrate 2 moved.

A solenoid 5 is connected to the scanner 3 in a controlling manner via the symbolically shown connection 4. The solenoid 5 has a switching flag 6 which can be moved upwardly or downwardly as indicated by arrows in dependence upon the drive of the solenoid 5. A scoring tool 7 is mounted at the lower end of the switching flag 6 facing the glass substrate and is, for example, a hard metal wheel. A position sensor 8 is assigned to the switching flag 6 at a suitable location. The output signal of the position sensor 8 is switched to the control input of the solenoid 5 as indicated by the broken line.

The "flying" scoring according to the invention functions as follows. The hard metal wheel 7 is moved with the start of the cutting movement against the edge of the glass substrate 1. When the wheel 7 touches the edge, the wheel experiences a slight displacing movement of maximally 1 mm. This relative position change of the wheel is detected by the sensor 8 and then a rapid lifting of the wheel by approximately 5 mm is triggered by means of the solenoid 5 via the control.

The lifting takes place in a time range of approximately 0 to 2 seconds.

The stroke movement of the scoring tool can also take place via a hydraulic or pneumatic actuator. The advantage of the solenoid, however, lies in its rapid reaction time.

The damage to the glass is held so low by the "flying" scoring according to the invention that the damage is not detectable by the unaided eye.

The essence of the invention is in the "flying" scoring, that is, a scoring in one movement with the laser cut. This scoring functions the fastest as described in the illustrated example; however, it can be realized in a slower sequence (but always still in the cutting movement) and also differently (for example, in the case that the scoring tool does not have a switching flag and is moved only by a control signal).

We claim:

1. A method for cutting a flat workpiece made of brittle material along a cutting line, the method comprising the steps of:

providing a scoring tool and a focused laser beam aligned with respect to said cutting line;

generating a relative movement between said focused laser beam and said flat workpiece;

imparting an initial score to said flat workpiece at the upper side edge thereof at the start of said cutting line with the scoring of said flat workpiece being coupled to a start of said movement for cutting said flat workpiece;

automatically raising said scoring tool by a predetermined stroke distance after scoring said edge thereby scoring said flat workpiece only at said upper side edge; and, moving said focused laser beam along said cutting line so that said scoring takes place in one movement with the laser cutting and said focused laser beam then inducing a thermomechanical stress along said cutting line greater than the breaking strength of said flat workpiece.

2. The method of claim 1, wherein the raising of said scoring tool takes place in a time interval of up to two seconds.

3. The method of claim 1, wherein said relative movement is generated by moving said laser beam along said cutting line utilizing a laser scanner.

4. An arrangement for cutting a flat workpiece made of a brittle material along a pregiven cutting line, the arrangement comprising:

means for directing a focused laser beam onto said cutting line;

a drive for generating a relative movement between said laser beam and said flat workpiece for guiding said focused laser beam along said pregiven cutting line so as to induce a thermomechanical stress in said workpiece greater than the breaking strength thereof along said cutting line;

a scoring tool for imparting an initial score to said workpiece at the start of said cutting line with the scoring of said flat workpiece being coupled to a start of said movement for cutting said flat workpiece;

said scoring tool being mounted next to the upper edge of said workpiece;

a device for rapidly lifting said scoring tool and said device being coupled to the cutting movement so that, at the start of the cutting movement or shortly thereafter compared to the total cutting time, said scoring tool is in operative contact with said flat workpiece for imparting said initial score thereto and then is rapidly raised.

5. The arrangement of claim 4, said device including a solenoid having a control input;

said solenoid including a switching flag movable between a first position and a second position and said switching flag including an end for accommodating said scoring tool thereon;

said device further including a position sensor for detecting said second position and for outputting a signal to said control input when said second position is detected; and, means for controlling said solenoid so that, after said scoring tool is moved by a corresponding movement of said switching flag at the start of the cutting movement against the edge of the workpiece and a vertical position change of the switching flag is triggered an activation of the solenoid takes place via said output signal of said position sensor and therewith a rapid lifting of the switching flag with the scoring tool.

6. The arrangement of claim 4, said device being formed by a hydraulic or pneumatic actuator.

* * * * *